United States Patent
Wu et al.

(10) Patent No.: US 6,975,890 B2
(45) Date of Patent: Dec. 13, 2005

(54) MOBILE PHONE

(75) Inventors: Kuo-Hsiang Wu, Taipei (TW); Hsiang-Lung Kao, Taipei (TW); Yung-Fa Cheng, Taipei (TW)

(73) Assignee: Quanta Computer, Inc., Tao Yuan (TW)

( * ) Notice: Subject to any disclaimer, the term of this patent is extended or adjusted under 35 U.S.C. 154(b) by 377 days.

(21) Appl. No.: 10/317,100

(22) Filed: Dec. 12, 2002

(65) Prior Publication Data

US 2003/0211868 A1 Nov. 13, 2003

(30) Foreign Application Priority Data

May 13, 2002 (TW) .............................. 91206775 U

(51) Int. Cl.⁷ ............................................... H04M 1/00
(52) U.S. Cl. ............................... 455/575.1; 455/550.1; 455/90.3; 455/575.8; 455/572; 379/428.01; 379/433.01
(58) Field of Search .......................... 455/575.1, 550.1, 455/572, 575.8, 90.3, 347, 128; 379/428.01, 379/433.01; 361/680

(56) References Cited

U.S. PATENT DOCUMENTS

| | | | |
|---|---|---|---|
| 5,955,700 A * | 9/1999 | Slipy et al. .................... 174/50 |
| 6,405,055 B1 * | 6/2002 | Silverbrook et al. ...... 455/556.1 |
| 6,434,404 B1 * | 8/2002 | Claxton et al. ............ 455/575.3 |
| 6,459,886 B1 * | 10/2002 | Friis ........................... 455/90.1 |
| 6,503,005 B1 * | 1/2003 | Cockerill et al. .............. 400/88 |
| 6,594,472 B1 * | 7/2003 | Curtis et al. .............. 455/575.8 |
| 2002/0089817 A1 * | 7/2002 | Eisenbraun .................. 361/680 |
| 2003/0198007 A1 * | 10/2003 | Wulff et al. ................. 361/680 |

FOREIGN PATENT DOCUMENTS

CN 2469628 Y 1/2002
TW 487258 5/2002

* cited by examiner

Primary Examiner—Joseph Feild
Assistant Examiner—Huy D. Nguyen
(74) Attorney, Agent, or Firm—Rabin & Berdo, PC

(57) ABSTRACT

A mobile phone including a covering lid, a body, a battery and a battery lid is provided according to the invention. Of which, the body is a mono-block casting with an opening section on the top, while the covering lid is coupled to the body via a first hinge such that the covering lid can be flipped to open from or flipped to close towards the body; the battery is installed inside the body and is loaded into or unloaded from the body via the opening section; the battery lid, which is installed on top of the opening section to hold the battery, is coupled to the body via a second hinge such the battery lid can also be flipped to open from or flipped to close towards the body. In practice, the battery lid can be a keypad module of the mobile phone, while the first and the second hinge can be situated at the same side either having respective axes or sharing the same axis. Moreover, the mobile phone can further include a circuit board which is installed between the battery and the body.

3 Claims, 2 Drawing Sheets

MOBILE PHONE

This application incorporates by reference of Taiwan application Serial No. 091206775, filed May 13, 2002.

BACKGROUND OF THE INVENTION

1. Field of the Invention

The invention relates in general to a mobile phone, and more particularly to mobile phone whose body is a mono-block casting.

2. Description of the Related Art

Along with the rapid growth in the industry of electronic products and advance in technology, new communication products are constantly brought forth and marketed. In recent years, portable electronic products, the mobile phone for example, which cover a versatile range of functions, have become a necessity to the public in their everyday life. Mobile phones of various manufacturers nowadays have very little differences in terms of functions. How to design a mobile phone with a more attractive exterior and a stronger external structure has thus become an important feature in attracting the consumers.

Please refer to FIG. 1, a structural diagram according to a conventional mobile phone. Mobile phone 100 has a covering lid 105 and a body 110. In general, a battery 120 and a circuit board 130 are installed inside the body 110 of the mobile phone 100, while a keypad module 140 is fixed onto the body 110. The battery 120 is loaded and unloaded via the opening of a battery lid 150. When using a mobile phone 100, a user might drop the mobile phone on the ground because of his or her loose grip of the mobile phone resulting in a separation between the battery lid 150 and the body 110 causing the battery 120 to be thrown out from the body 110. Worse than that, the electronic and mechanic elements inside the body 110 might therefore be damaged. The battery lid 150, which is designed to facilitate the loading and unloading of the battery 120, results in a mobile phone with insufficient strength. As a consequence, the battery 120 separates from the body easily when hit by external forces. Furthermore, the exterior design of the mobile phone 100 is restricted because the design of the battery 150 has to be taken into consideration first.

It can be summarized from the foregoing disclosure that a conventional mobile phone has the following disadvantages:

1. Insufficient strength. Since the battery lid is designed to be on the surface of the body of the mobile phone, it is easily for the battery lid to be separated from the body when the mobile phone is hit by external forces causing the battery to be thrown out from the body or even causing damage to the electronic and mechanic elements therein.

2. Restriction on the exterior design of a mobile phone. To facilitate battery loading/unloading, it is necessary to have a battery lid on the surface of the body. However, this imposes restriction on the design of the exterior of a mobile phone.

SUMMARY OF THE INVENTION

It is therefore an object of the invention to provide a mobile phone for the following purposes:

1. To enhance the strength of a mobile phone.
2. To lift the restriction on the exterior design of a mobile phone.

The invention achieves the above-identified objects by providing a mobile phone whose structural features are briefed as follows.

A mobile phone including a covering lid, a body, a battery and a battery lid is provided according to the invention. Of which, the body is a mono-block casting with an opening section on the top, while the covering lid is coupled to the body via a first hinge such that the covering lid can be flipped to open from or flipped to close towards the body; the battery is installed inside the body and is loaded into or unloaded from the body via the opening section; the battery lid, which is installed on top of the opening section to hold the battery, is coupled to the body via a second hinge such the battery lid can also be flipped to open from or flipped to close towards the body. In practice, the battery lid can be a keypad module of the mobile phone, while the first and the second hinge can be situated at the same side either having respective axes or sharing the same axis. Moreover, the mobile phone can further include a circuit board which is installed between the battery and the body.

Other objects, features, and advantages of the invention will become apparent from the following detailed description of the preferred but non-limiting embodiments. The following description is made with reference to the accompanying drawings.

DETAILED DESCRIPTION OF THE INVENTION

The key feature for the mobile phone according to the invention is a mono-block design of the body allowing the battery to be loaded and unloaded via the opening of a keypad module without having a battery lid. The body of a conventional mobile phone is designed to have a battery lid to facilitate battery loading/unloading. However, such design has at least two disadvantages: first, such structural design produces a weaker strength; second, restriction on the exterior design of a mobile phone occurs. Since the battery lid is designed to be on the surface of the mobile phone body, it is easy for the battery lid to separate from the body when the mobile phone is hit by external forces causing the battery to be thrown from the body or even causing damage to the electronic and mechanic elements therein. When designing the integral exterior of a mobile phone, restriction occurs because the design of a battery lid has to be taken into consideration first. While the invention provides a mobile phone whose body is a mono-block casting without any battery lid on its surface, the battery is loaded and unloaded via the opening of a keypad module which is coupled to the body. Such a design not only enhances the integral structural strength of the body, but also gives diversities to the exterior design of a mobile phone. Practical embodiments of the invention are disclosed and explained hereinafter.

Figure 1:
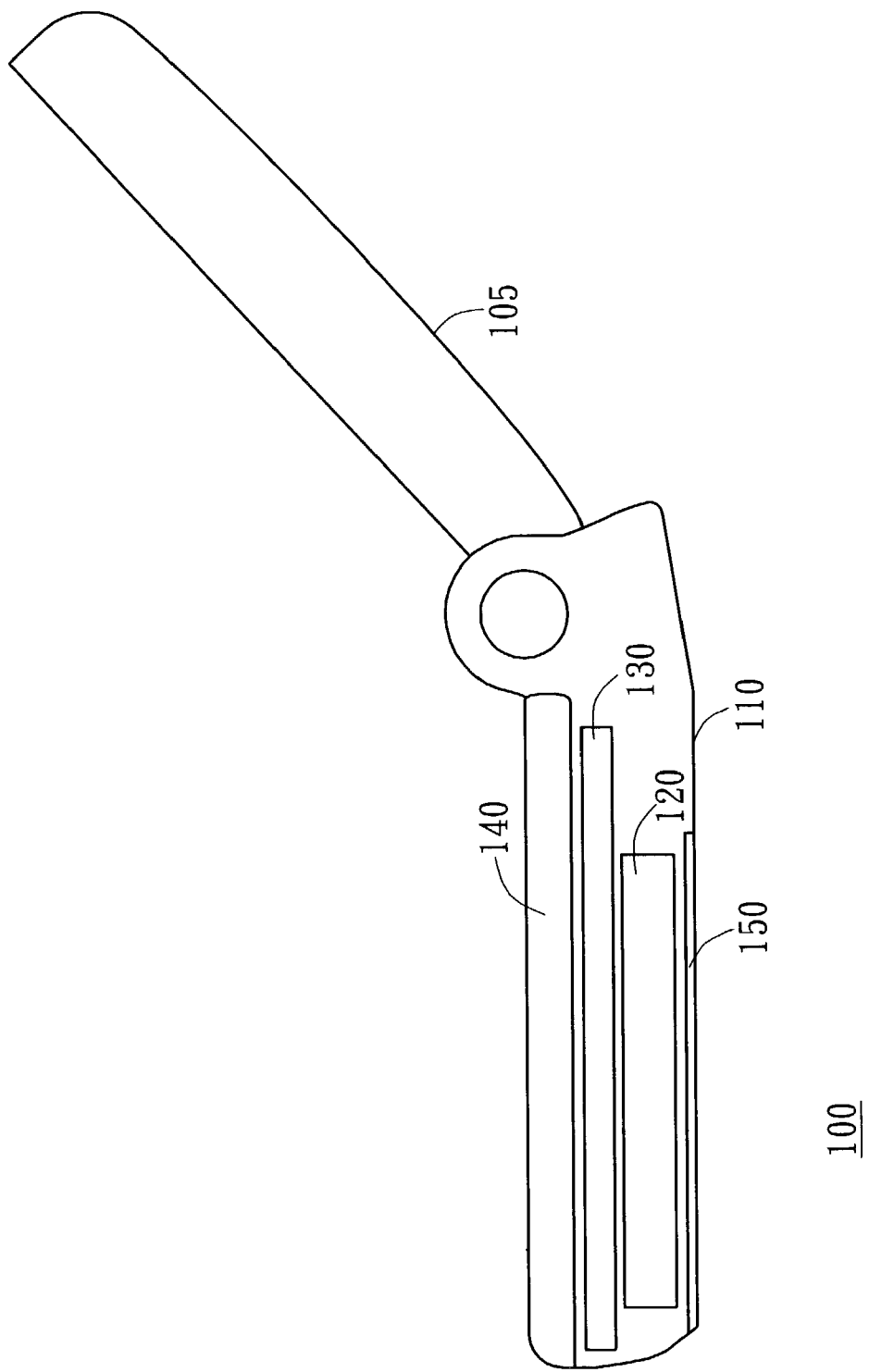
FIG. 1, a structural diagram according to a conventional mobile phone.
Figure 2:
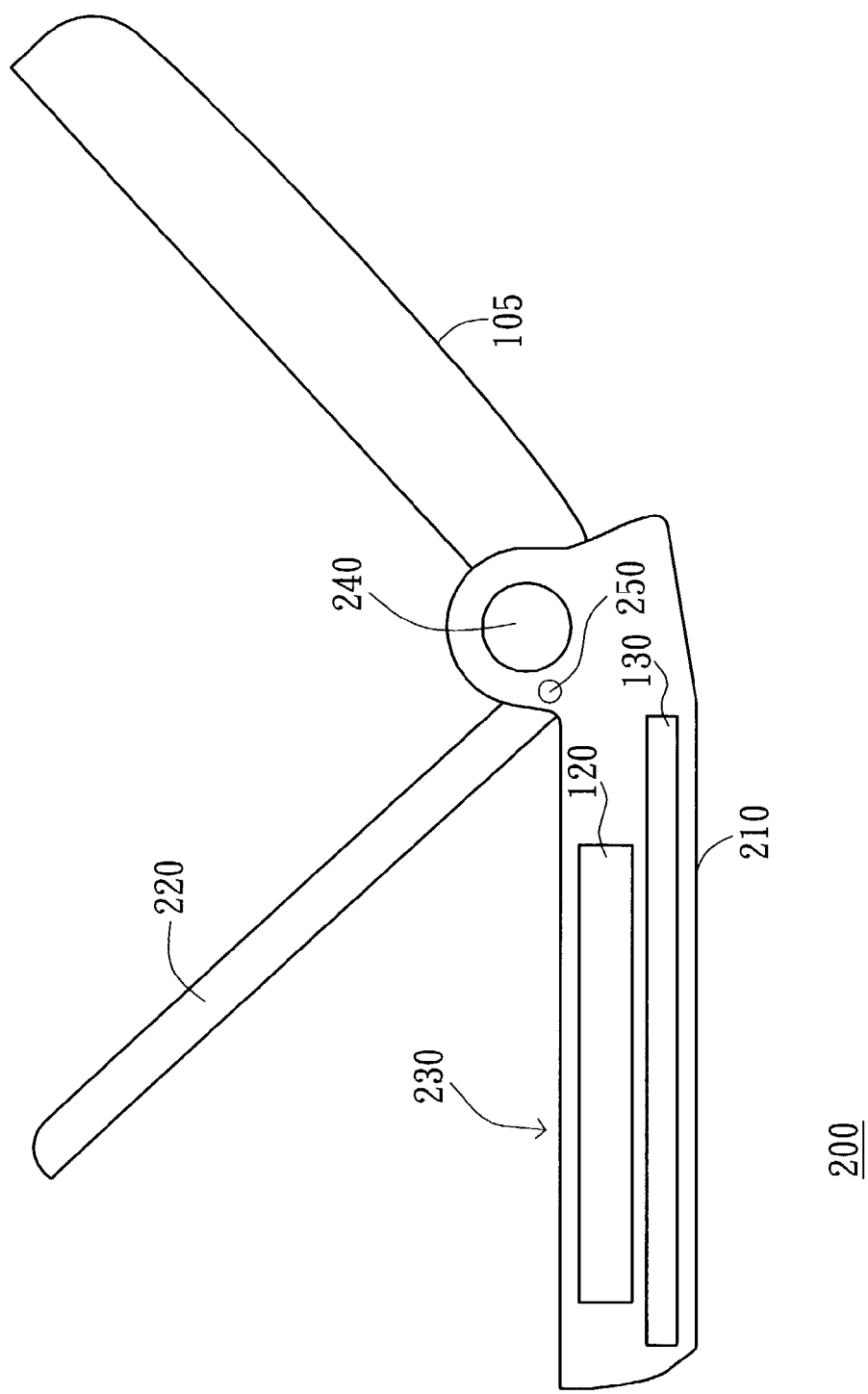
FIG. 2, a structural diagram of a mobile phone according to a preferred embodiment of the invention.

Referring to FIG. 2, a structural diagram of a mobile phone according to a preferred embodiment of the invention. A mobile phone 200 includes a covering lid 105, a body 210, a battery 120 and a battery lid, wherein the battery lid can be a keypad module 220 of the mobile phone 200. The body 210 is a mono-block casting with an opening section 230 on the top; the covering lid 105 is coupled to the body 210 via a hinge 240 so that the covering lid 105 can be flipped to open from or flipped to close towards the body 210. Most importantly, in order to enhance the structural strength of the body 210, the structure of the body must maintain a whole without being damaged. Therefore, the body 210 adopts a mono-block casting design without having a battery lid at its rear. An opening section 230 is designed to be on the top of the body 210 allowing the battery 120 to be loaded and unloaded. In another aspect, the keypad module 220 is installed on top of the opening section 230 to hold the battery 120 firmly preventing a loose grip of the battery. The keypad module 220 is coupled to the body 210 via a hinge 250 so that the keypad module 220 can be flapped to open from or flipped to close towards the body 210. When replacing battery, the user only needs to lift the keypad module to open so that the battery can be loaded or unloaded accordingly. The mobile phone 200 can further include a circuit board 130 which can be installed under the battery 120 and in the body 210. In practice, the first and the second hinge can be situated at the same side either having respective axes or sharing the same axis (which means the hinge 240 coincides with the hinge 250).

It is noteworthy that the geometric structure for the parts and elements described in the embodiment of the invention should be regarded as an example of an embodiment of the invention and should not be used to limit the application of the invention. Anyone who is familiar the technology of the invention can make necessary adjustments to achieve a similar function without violating the spirit of the invention.

The mobile phone according to the invention disclosed in the foregoing embodiment has the following advantages:

1. The strength of the mobile phone is enhanced. Since the body is a mono-block casting, there is no need to have a battery lid on its surface. The battery is loaded and unloaded via the opening of the body and is held firmly by a keypad module. Even when the mobile phone is hit by external forces, the battery will still stay firmly inside the body and not any electronic and mechanic elements inside the body will be damaged.

2. The exterior design of a mobile phone is no more restricted. The mono-block design of the body gives diversities to the exterior design of a mobile phone.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile phone, comprising:

a body, which is a mono-block casting and has an opening section;

a covering lid, which is coupled to the body via a first hinge such that the covering lid can be flipped to open from or flipped to close towards the body;

a battery, which is installed inside the body and is loaded into or unloaded from the body via the opening section; and a battery lid, which is installed on top of the opening section to hold the battery firmly and is coupled to the body via a second hinge such the battery lid can also be flipped to open from or flipped to close towards the body;

wherein the first hinge and the second hinge are situated at the same axis, and wherein the battery lid is a keypad module of the mobile phone.

2. The mobile phone according to claim 1, wherein the mobile phone further comprises a circuit board which is installed under the battery and in the body.

3. The mobile phone according to claim 1, wherein the mobile phone further comprises a circuit board which is installed under the battery and in the body.

* * * * *